(12) United States Patent
Pierfelice

(10) Patent No.: US 8,577,600 B1
(45) Date of Patent: Nov. 5, 2013

(54) NAVIGATION SYSTEMS AND VEHICLES FOR PROVIDING TRAFFIC INFORMATION PERTAINING TO PRE-DEFINED LOCATIONS OF INTEREST

(75) Inventor: Jeffrey E. Pierfelice, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/536,178

(22) Filed: Jun. 28, 2012

(51) Int. Cl.
*G01C 21/00* (2006.01)
(52) U.S. Cl.
USPC .......................................................... 701/420
(58) Field of Classification Search
None
See application file for complete search history.

(56) References Cited

U.S. PATENT DOCUMENTS

| | | | |
|---|---|---|---|
| 5,291,413 A | 3/1994 | Tamai et al. | |
| 6,297,748 B1 | 10/2001 | Lappenbusch et al. | |
| 6,810,329 B2 | 10/2004 | Koga | |
| 6,917,876 B2 | 7/2005 | Martell et al. | |
| 7,089,110 B2 | 8/2006 | Pechatnikov et al. | |
| 8,099,236 B2 | 1/2012 | Olson et al. | |
| 2007/0276596 A1 | 11/2007 | Solomon et al. | |
| 2009/0177391 A1 | 7/2009 | Yakali | |
| 2010/0136944 A1* | 6/2010 | Taylor et al. | 455/404.1 |
| 2010/0286899 A1* | 11/2010 | Jain et al. | 701/119 |
| 2011/0053552 A1 | 3/2011 | Kim et al. | |
| 2011/0071758 A1 | 3/2011 | Cho et al. | |

FOREIGN PATENT DOCUMENTS

EP 1262936 4/2002

* cited by examiner

*Primary Examiner* — Thomas Tarcza
*Assistant Examiner* — Adam Alharbi
(74) *Attorney, Agent, or Firm* — Dinsmore & Shohl LLP

(57) ABSTRACT

Navigation systems and vehicles for providing traffic information pertaining to pre-defined locations of interest are provided. A navigation system or a vehicle may present a traffic location input control on a display of the navigation system or vehicle, detect a tactile input indicative of a selection of a traffic location icon shown on the display, and automatically provide traffic information pertaining to a location of interest associated with the selected traffic location icon. A navigation system or a vehicle may determine a route between a current position and the farther of a first pre-defined location of interest and a second pre-defined location of interest, provide traffic information pertaining to the determined route, and deactivate turn-by-turn navigation.

20 Claims, 8 Drawing Sheets

| | | |
|---|---|---|
| 1 | STATIONARY TRAFFIC | |
| 2 | TRAFFIC JAM (QUEUING TRAFFIC) | |
| 3 | ACCIDENTS | |
| 4 | CLOSED ROAD | |
| 5 | ROAD WORKS | |
| 6 | DANGER (DISASTER INFORMATION) | |
| 7 | ROAD CONDITIONS | |
| 8 | WEATHER | |
| 9 | DELAYS (DELAYS BY THE STATIONARY/QUEUING TRAFFIC) | |
| 10 | PARKING (SA/PA INFORMATION) | |
| 11 | OUT OF ORDER (OTHER THAN THOSE ABOVE) | |

FIG. 4

NAVIGATION SYSTEMS AND VEHICLES FOR PROVIDING TRAFFIC INFORMATION PERTAINING TO PRE-DEFINED LOCATIONS OF INTEREST

TECHNICAL FIELD

Embodiments described herein generally relate to navigation systems and vehicles for providing traffic information and, more specifically, to navigation systems and vehicles for providing traffic information pertaining to pre-defined locations of interest.

BACKGROUND

A driver may wish to be provided traffic information in order to reduce the driver's travel time by avoiding traffic and other conditions on roads that the user may travel. Oftentimes, a driver may frequently travel near particular locations of interest or along particular routes (e.g., the driver may frequently commute from the driver's home to the driver's work, and vice versa). In such an example, the driver may wish to be provided traffic information pertaining to the driver's home, the driver's work, the commuting route between the driver's home and the driver's work and/or other pre-defined locations of interest so that the driver may navigate in a manner that reduces travel time.

Accordingly, a need exists for navigation systems and vehicles for providing traffic information pertaining to pre-defined locations of interest.

SUMMARY

In one embodiment, a navigation system for providing traffic information includes one or more processors, a display communicatively coupled to the one or more processors, one or more memory modules communicatively coupled to the one or more processors, a first pre-defined location of interest stored in the one or more memory modules, and machine readable instructions stored in the one or more memory modules. The machine-readable instructions stored in the one or more memory modules cause the navigation system to automatically present a traffic location selection input control on the display. The traffic location selection input control includes a first traffic location icon associated with the first pre-defined location of interest. The machine-readable instructions stored in the one or more memory modules further cause the navigation system to detect a tactile input indicative of a selection of the first traffic location icon and automatically provide traffic information pertaining to the first pre-defined location of interest on the display in response to detecting the tactile input indicative of the selection of the first traffic location icon.

In another embodiment, a navigation system for providing traffic information includes one or more processors, a display communicatively coupled to the one or more processors, a satellite antenna communicatively coupled to the one or more processors, one or more memory modules communicatively coupled to the one or more processors, a first pre-defined location of interest and a second pre-defined location of interest stored in the one or more memory modules, and machine readable instructions stored in the one or more memory modules. The satellite antenna receives a signal from one or more global positioning system satellites. When executed by one or more processors, the machine readable instructions cause the navigation system to transform the signal from the one or more global positioning system satellites into a current position of the navigation system, automatically calculate a first distance from the first pre-defined location of interest to the current position and automatically calculate a second distance from the second pre-defined location of interest to the current position. The machine readable instructions further cause the navigation system to automatically compare the first distance and the second distance to determine whether the first pre-defined location of interest or the second pre-defined location of interest is farther from the current position. The machine readable instructions further cause the navigation system to determine, automatically, a route between the current position and the farther of the first pre-defined location of interest and the second pre-defined location of interest, provide traffic information pertaining to the determined route, and deactivate turn-by-turn navigation.

In yet another embodiment, a vehicle for providing traffic information includes one or more processors, a display communicatively coupled to the one or more processors, a satellite antenna communicatively coupled to the one or more processors, one or more memory modules communicatively coupled to the one or more processors, a home location and a work location stored in the one or more memory modules, and machine readable instructions stored in the one or more memory modules. The satellite antenna receives a signal from one or more global positioning system satellites. When executed by one or more processors, the machine readable instructions cause the vehicle to automatically present a commute icon on the display. The commute icon is associated with the home location and the work location. The machine readable instructions further cause the vehicle to detect a tactile input indicative of a selection of the commute icon, transform the signal from the one or more global positioning system satellites into a current position of the navigation system, automatically calculate a first distance from the home location to the current position, and automatically calculate a second distance from the work location to the current position. The machine readable instructions cause the vehicle to automatically compare the first distance and the second distance to determine whether the home location or the work location is farther from the current position, automatically determine a route between the current position and the farther of the home location and the work location, provide traffic information pertaining to the determined route, and deactivate turn-by-turn navigation.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 4 schematically depicts a table of incident icons that may be displayed on the navigation system of FIG. 1, according to one or more embodiments shown and described herein;

DETAILED DESCRIPTION

The embodiments disclosed herein include navigation systems and vehicles for providing traffic information pertaining to pre-defined locations of interest. Some embodiments may present a traffic location input control on a display of a navigation system, detect a tactile input indicative of a selection of a traffic location icon shown on the screen, and automatically provide traffic information pertaining to a location of interest associated with the selected traffic location icon. Other embodiments may determine a route between a current position and the farther of a first pre-defined location of interest and a second pre-defined location of interest, provide traffic information pertaining to the determined route, and deactivate turn-by-turn navigation. The various navigation systems and vehicles for providing traffic information pertaining to pre-defined locations of interest will be described in more detail herein with specific reference to the corresponding drawings.

Figure 1:
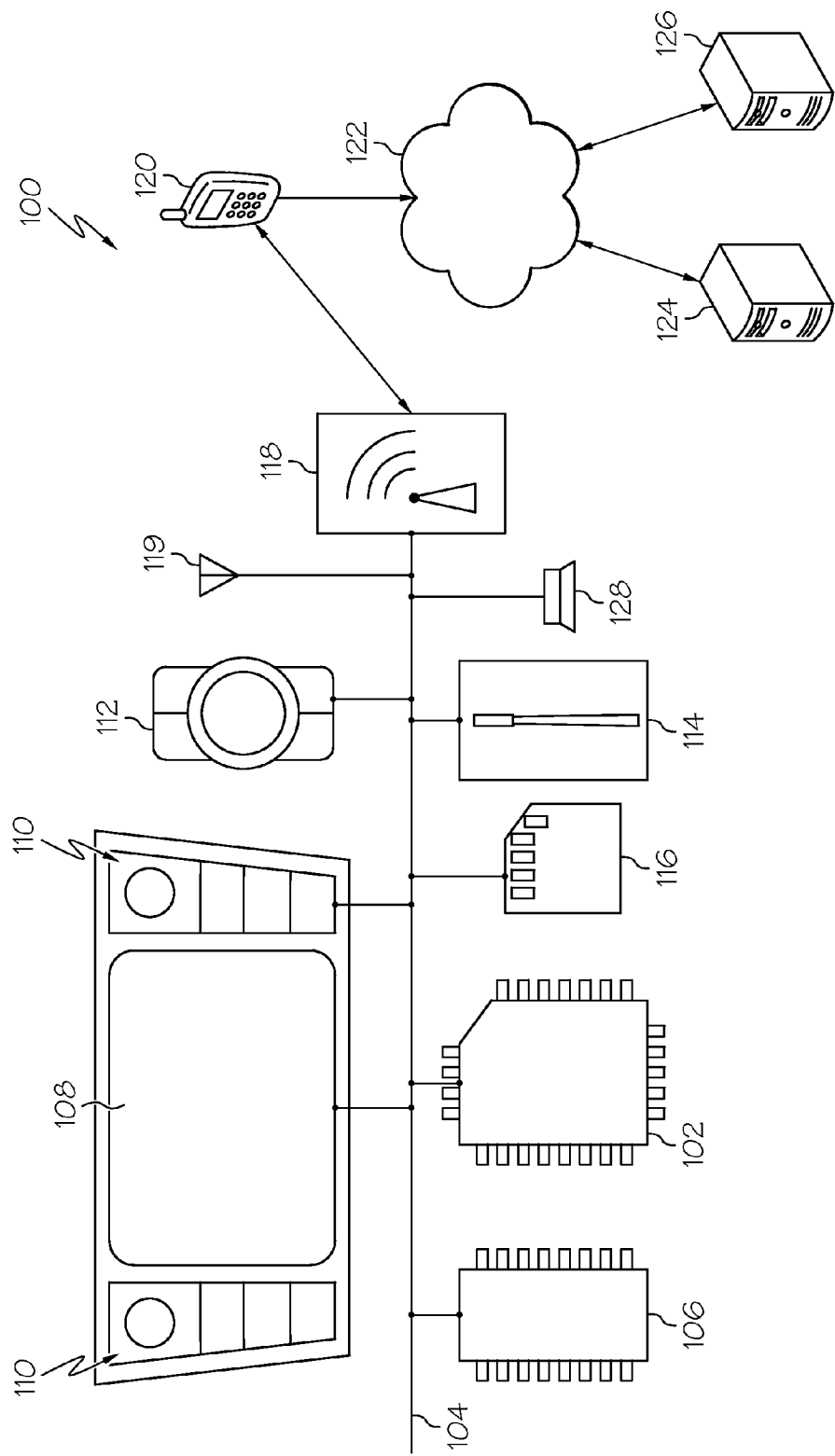
FIG. 1 schematically depicts a navigation system, according to one or more embodiments shown and described herein.

Referring now to FIG. 1, an embodiment of a navigation system 100 is schematically depicted. It is noted that, while the navigation system 100 is depicted in isolation, the navigation system 100 can be coupled to a vehicle (not depicted in the figures). The vehicle may be an automobile or any other passenger or non-passenger vehicle such as, for example, a terrestrial, aquatic, and/or airborne vehicle.

The navigation system 100 includes one or more processors 102. Each of the one or more processors 102 may be any device capable of executing machine readable instructions. Accordingly, each of the one or more processors 102 may be a controller, an integrated circuit, a microchip, a computer, or any other computing device. The one or more processors 102 are coupled to a communication path 104 that provides signal interconnectivity between various modules of the navigation system. Accordingly, the communication path 104 may communicatively couple any number of processors with one another, and allow the modules coupled to the communication path 104 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Accordingly, the communication path 104 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The navigation system 100 includes one or more memory modules 106 coupled to the communication path 104. The one or more memory modules 106 may comprise RAM, ROM, flash memories, hard drives, or any device capable of storing machine readable instructions such that the machine readable instructions can be accessed by the one or more processors 102. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 106. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 1, the navigation system 100 comprises a display 108 for providing visual output such as, for example, maps, navigation, entertainment, information, or a combination thereof. The display 108 is coupled to the communication path 104. Accordingly, the communication path 104 communicatively couples the display 108 to other modules of the navigation system 100. The display 108 may include any medium capable of transmitting an optical output such as, for example, a cathode ray tube, light emitting diodes, a liquid crystal display, a plasma display, or the like. Moreover, the display 108 may be a touchscreen that, in addition to providing optical information, detects the presence and location of a tactile input upon a surface of or adjacent to the display. Accordingly, each display may receive mechanical input directly upon the optical output provided by the display. Additionally, it is noted that the display 108 can include at least one of the one or more processors 102 and the one or memory modules 106.

The navigation system 100 depicted in FIG. 1 comprises a speaker 128 for transforming data signals from the navigation system 100 into mechanical vibrations, such as in order to provide an audible indication of traffic information. The speaker 128 can be coupled to the communication path 104 such that the communication path 104 communicatively couples the speaker 128 to the other modules of the navigation system 100. However, it should be understood that in other embodiments the navigation system 100 may not include the speaker 128.

The depicted navigation system 100 comprises tactile input hardware 110 coupled to the communication path 104 such that the communication path 104 communicatively couples the tactile input hardware 110 to other modules of the navigation system 100. The tactile input hardware 110 may be any device capable of transforming mechanical, optical, or electrical signals into a data signal capable of being transmitted with the communication path 104. Specifically, the tactile input hardware 110 may include any number of movable objects that each transform physical motion into a data signal that can be transmitted to over the communication path 104 such as, for example, a button, a switch, a knob, a microphone or the like. In some embodiments, the display 108 and the tactile input hardware 110 are combined as a single module and operate as an audio head unit or an infotainment system. However, it is noted, that the display 108 and the tactile input hardware 110 may be separate from one another and operate as a single module by exchanging signals via the communication path 104.

The navigation system 100 optionally comprises a peripheral tactile input 112 coupled to the communication path 104 such that the communication path 104 communicatively couples the peripheral tactile input 112 to other modules of the navigation system 100. For example, in one embodiment, the peripheral tactile input 112 is located in a vehicle console to provide an additional location for receiving input. The peripheral tactile input 112 operates in a manner substantially similar to the tactile input hardware 110, i.e., the peripheral tactile input 112 includes movable objects and transforms motion of the movable objects into a data signal that may be transmitted over the communication path 104.

The navigation system 100 comprises a satellite antenna 114 coupled to the communication path 104 such that the communication path 104 communicatively couples the satellite antenna 114 to other modules of the navigation system 100. The satellite antenna 114 is configured to receive signals from global positioning system satellites. Specifically, in one embodiment, the satellite antenna 114 includes one or more conductive elements that interact with electromagnetic signals transmitted by global positioning system satellites. The received signal is transformed into a data signal indicative of the location (e.g., latitude and longitude) of the satellite antenna 114 or an object positioned near the satellite antenna 114, by the one or more processors 102. The satellite antenna 114 may also be configured to receive satellite radio signals containing traffic information from satellite radio satellites. In an embodiment in which the satellite antenna 114 is also configured to receive satellite radio signals containing traffic information, the received signal may be transformed into a data signal indicative of traffic information. While the satellite antenna 114 may be configured to receive signals from global positioning system satellites and from satellite radio satellites in some embodiment, in other embodiments separate satellite antennas may be utilized to separately receive signals from global positioning system satellites and from satellite radio satellites, respectively. Additionally, it is noted that the satellite antenna 114 may include at least one of the one or more processors 102 and the one or memory modules 106.

The navigation system 100 optionally comprises a radio antenna 119 coupled to the communication path 104 such that the communication path 104 communicatively couples the radio antenna 119 to other modules of the navigation system 100. The radio antenna 119 is configured to receive radio signals, such as those transmitted by radio stations. Specifically, in one embodiment, the radio antenna 119 can include one or more conductive elements that interact with electromagnetic signals transmitted by radio stations. The received signals may be transformed into a data signal indicative of traffic information by the one or more processors 102.

In embodiments where the navigation system 100 is coupled to a vehicle, the one or more processors 102 execute machine readable instructions to transform the global positioning satellite signals received by the satellite antenna 114 into data indicative of the positioning of the vehicle with respect to road data, i.e., the vehicle position can be indicated on a map. The road data may be stored as machine readable instructions in the one or more memory modules 106. Alternatively or additionally, road data may be stored on a removable data module 116. Specifically, the removable data module 116 may be coupled to the communication path 104 via a socket with a movable member. The movable member may transition between states that apply varying amounts of force to the removable data module 116. Accordingly, the removable data module 116 may be optical media, solid state flash memory (e.g., USB or memory card), or a combination thereof.

The navigation system 100 optionally comprises network interface hardware 118 for communicatively coupling the navigation system 100 with a mobile device 120 or a computer network. The network interface hardware 118 is coupled to the communication path 104 such that the communication path 104 communicatively couples the network interface hardware 118 to other modules of the navigation system 100. The network interface hardware 118 can be any device capable of transmitting and/or receiving data via a wireless network. Accordingly, the network interface hardware 118 can include a communication transceiver for sending and/or receiving data according to any wireless communication standard. For example, the network interface hardware 118 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like.

As is noted above, the navigation system 100 can be communicatively coupled to a mobile device 120 via the network interface hardware 118. The mobile device 120 may be any device having hardware (e.g., chipsets, processors, memory, etc.) for communicatively coupling with the network interface hardware 118 and a cellular network 122. Specifically, the mobile device 120 can include an antenna for communicating over one or more of the wireless computer networks described above. Moreover, the mobile device 120 can include a mobile antenna for communicating with the cellular network 122. Accordingly, the mobile antenna can be configured to send and receive data according to a mobile telecommunication standard of any generation (e.g., 1G, 2G, 3G, 4G, 5G, etc.). Specific examples of a mobile device 120 include, but are not limited to, smart phones, tablet devices, e-readers, laptop computers, or the like.

The cellular network 122 generally includes a plurality of base stations that are configured to receive and transmit data according to mobile telecommunication standards. The base stations are further configured to receive and transmit data over wired systems such as public switched telephone network (PSTN) and backhaul networks. The cellular network 122 may further include any network accessible via the backhaul networks such as, for example, wide area networks, metropolitan area networks, the Internet or the like. Thus, the base stations generally include one or more antennas, transceivers, and processors that execute machine readable instructions to exchange data over various wired and/or wireless networks.

Accordingly, the cellular network 122 may be utilized as a wireless access point by the mobile device 120 to access a first server 124 and/or a second server 126. The first server 124 and second server 126 generally include processors, memory, and chipsets for delivering resources via the cellular network 122. Resources can include providing, for example, processing, storage, software, and information from the first server 124 and/or the second server 126 via the cellular network 122. Additionally, it is noted that the first server 124 or the second server 126 can share resources with one another over the cellular network 122 such as, for example, via the wired portion of the network, the wireless portion of the network, or combinations thereof.

The navigation system 100 may obtain traffic information from a variety of external sources, including a signal received from the satellite antenna 114, a signal received from the radio antenna 119, or a signal received from the network interface hardware 118 (which may communicatively couple the navigation system 100 with the mobile device 120 and/or a computer network). The received signal may be transformed into data indicative of the traffic information with respect to road data, i.e., traffic flow information for road segments or points of a map, weather information associated with road segments or points of a map, construction information associated with road segments or points of a map, road closure information associated with road segments of a map, disaster information associated with road segments or points of a map, etc.). As noted above, the road data may be stored in the one or more memory modules 106. The traffic information, once transformed, may be stored in the one or more memory modules 106 and accessed by the one or more processors 102 in order to provide traffic information in accordance with the described embodiments.

Figure 2:
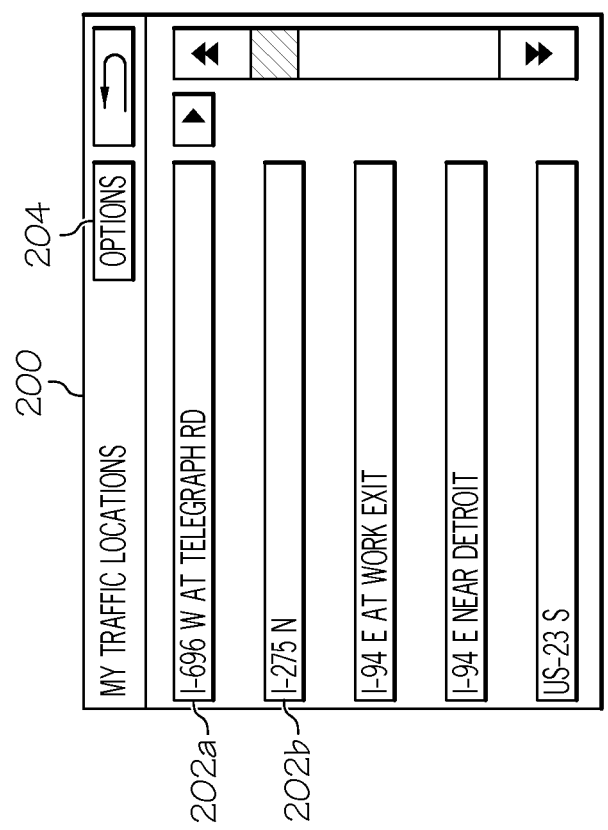
FIG. 2 schematically depicts a traffic location selection input control on the display of the navigation system of FIG. 1, according to one or more embodiments shown and described herein.

Referring now to FIGS. 1 and 2, in one embodiment, the machine readable instructions stored in the one or more memory modules 106, when executed by the one or more processors 102, cause the navigation system 100 to present a traffic location selection input control 200 on the display 108. The displayed traffic location selection input control 200 includes a first traffic location icon 202a. The first traffic location icon 202a is associated with a first pre-defined location of interest stored in the one or more memory modules 106. The first pre-defined location of interest may be stored in the one or more memory modules 106 in a variety of ways, including but not limited to, as a GPS location, as a particular location on a map stored in the one or more memory modules 106, etc. In the embodiment depicted in FIG. 2, the first traffic location icon 202a is associated with a first pre-defined location of interest corresponding to a location on Interstate 696 W at the Telegraph road exit.

The displayed traffic location selection input control 200 may include a second traffic location icon 202b. The second traffic location icon 202b may be associated with a second pre-defined location of interest stored in the one or more memory modules 106. As with the first pre-defined location of interest, the second pre-defined location of interest may be stored in the one or more memory modules 106 in a variety of ways, including but not limited to, as a GPS location, as a particular location on a map stored in the one or more memory modules 106, etc. In the exemplary embodiment depicted in FIG. 2, the second traffic location icon 202b is associated with a second pre-defined location of interest corresponding to Interstate 275 N.

While the embodiment of the displayed traffic location selection input control 200 depicted in FIG. 2 includes five displayed traffic location icons, each of which is associated with a pre-defined location of interest stored in the one or more memory modules 106, other embodiments may include more or less traffic location icons. Each of the pre-defined locations of interest may be associated with a particular location (e.g., a particular GPS coordinate), a street (e.g., a particular highway or surface street), a portion of a street or highway (e.g., I-94 near Detroit), etc.

Still referring to FIGS. 1 and 2, the machine readable instructions stored in the one or more memory modules 106, when executed by the one or more processors 102, may cause the navigation system 100 to detect a tactile input indicative of a selection of the first traffic location icon 202a. In one embodiment, a user may provide mechanical input (e.g., by pressing) the tactile input hardware 110 in a manner indicative of a selection of the first traffic location icon 202a. In such an embodiment, the navigation system 100 may detect the tactile input associated with the user's mechanical input to the tactile input hardware 110. In another embodiment in which display 108 is a touchscreen, a user may provide mechanical input (e.g., by pressing) to a region of the touchscreen indicative of a selection of the first traffic location icon 202a. In such an embodiment, the navigation system 100 may detect the tactile input associated with the user's mechanical input to the region of the touchscreen associated with the first traffic location icon 202a. In yet another embodiment, the navigation system 100 may detect the tactile input associated with the peripheral tactile input 112 associated with the user's mechanical input to the peripheral tactile input 112. In such an embodiment, the navigation system 100 may detect the tactile input associated with the user's mechanical input to the peripheral tactile input 112.

Still referring to FIGS. 1 and 2, in response to the received tactile input indicative of the selection of the first traffic location icon, the machine readable instructions stored in the one or more memory modules 106, when executed by the one or more processors 102, may cause the navigation system 100 to automatically provide traffic information pertaining to the first pre-defined location of interest associated with the selected first traffic location icon.

Figure 3:
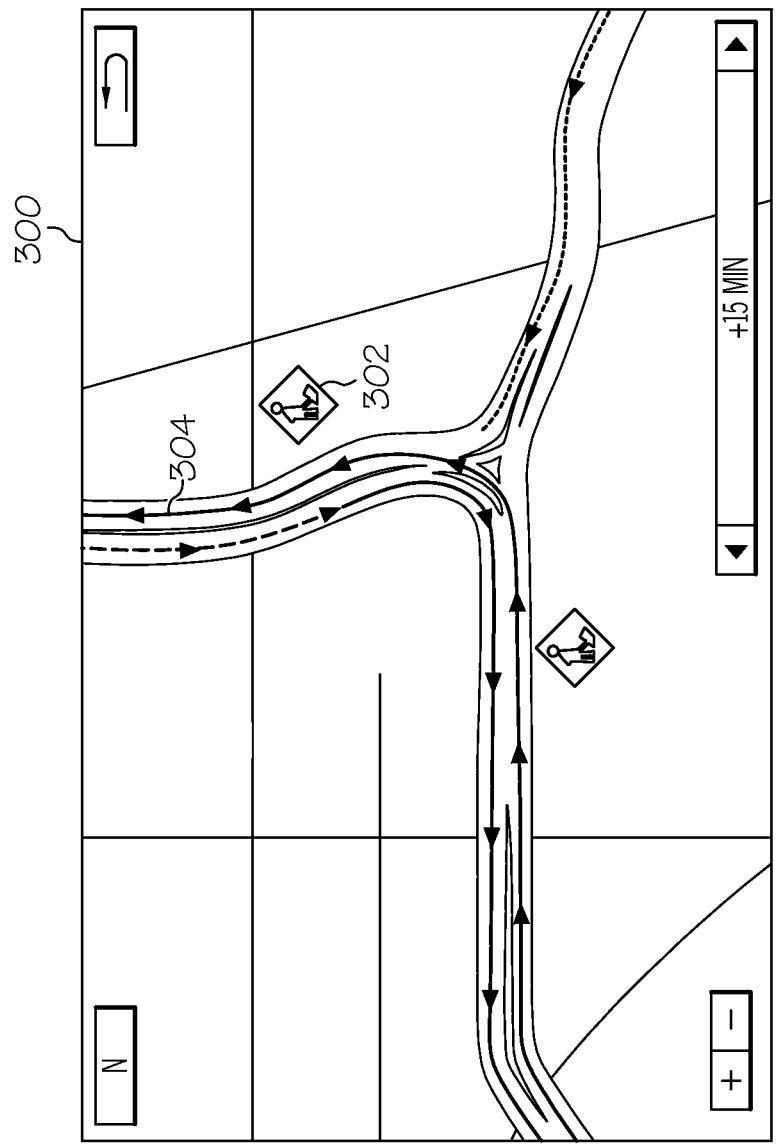
FIG. 3. schematically depicts a map providing traffic information on the display of the navigation system of FIG. 1, according to one or more embodiments shown and described herein.

Referring now to FIG. 3, in one embodiment, the navigation system 100 may present a map 300 on the display 108. The map 300 includes a geographic area including the first pre-defined location of interest. In some embodiments, the presented map may be centered about the first pre-defined location of interest, while in other embodiments the first pre-defined location of interest may merely be included on the presented map. In some embodiments, a graphical indication of the first pre-defined location of interest may be displayed on the map 300 (e.g., a crosshair or a cursor), while in other embodiments the first pre-defined location of interest may not be differentiated on the presented map.

The traffic information pertaining to the first pre-defined location of interest may be visually presented on the map. In one embodiment, the visually presented traffic information may include a traffic flow indicator 304 positioned adjacent to or on top of an associated road segment of the map. The traffic flow indicator 304 provides a visual indication of the traffic flow on the associated segment. In some embodiments, the traffic flow indicator 304 may be superimposed on the associated road segment. In other embodiments, the traffic flow indicator 304 may be displayed adjacent to the associated road segment. While the traffic flow indicator 304 of FIG. 3 includes arrows, in other embodiments, the traffic flow indicator 304 may not include arrows, for example if it is displayed as a solid line. The color of the traffic flow indicator 304 may provide a visual indication of the traffic flow on the associated road segment. For example, in one embodiment, the traffic flow indicator may be green to indicate light traffic, yellow or orange to indicate medium traffic, red to indicate high traffic, and black to indicate that the road is closed. However, it should be understood that in other embodiments the traffic flow indicator may be colored differently to communicate other information pertaining to the road segment that it is associated with. While the embodiment of FIG. 3 includes a traffic flow indicator 304, other embodiments may provide traffic information pertaining to the first pre-defined location of interest in another manner.

In an embodiment that visually presents the traffic information pertaining to the first pre-defined location of interest on the map, the visually presented traffic information may include an incident icon 302 positioned adjacent to or on top of an associated road segment of the map. The incident icon may provide a visual indication of conditions that may impact travel along a road segment near the first pre-defined location of interest (e.g., traffic information, weather information, construction information, road closure information, disaster information, etc.). Referring now to FIG. 4, an exemplary table 400 of incident icons is depicted. As shown in FIG. 4, the incident icon of row 1 represents stationary traffic, the incident icon of row 2 represents a traffic jam, the incident icon of row 3 represents one or more accidents, the incident icon of row 4 represents a closed road, the incident icon of row 5 represents road work or construction, the incident icon of row 6 represents danger, the incident icon of row 7 represents road conditions, the incident icon of row 8 represents weather, the incident icon of row 9 represents delays, the incident icon of row 10 represents parking information, and the incident icon of row 11 represents out of order. While incident icons 1, 2, and 9 are depicted as the same in FIG. 4, it should be understood that incident icons of rows 1, 2, and 9 may differ from one another in other embodiments. It should also be understood that the incident icons depicted in FIG. 4 are merely exemplary and that in other embodiments additional or different incident icons may be used to represent the same or additional information. Further, while the embodiment of FIG. 3 includes an incident icon 302, other embodiments may provide traffic information pertaining to the first pre-defined location of interest in another manner. Moreover, while the embodiment of FIG. 3 includes both a traffic flow indicator 304 and an incident icon 302, other embodiments may include only one of the traffic flow indicator 304 and the incident icon 302.

As an alternative to, or in addition to, providing traffic information on display 108 as described above, the machine readable instructions stored in the one or more memory modules 106, when executed by the one or more processors 102, may cause the navigation system 100 to provide the traffic information as an audible indication through speaker 128. The audible indication may include one or more incidents near the first pre-defined location of interest (e.g., traffic information, weather information, construction information, road closure information, disaster information, etc.). The audible indication may also include traffic flow information pertaining to one or more road segments near the first pre-defined location of interest (e.g., average speed, relative traffic volume, etc.).

Figure 5:
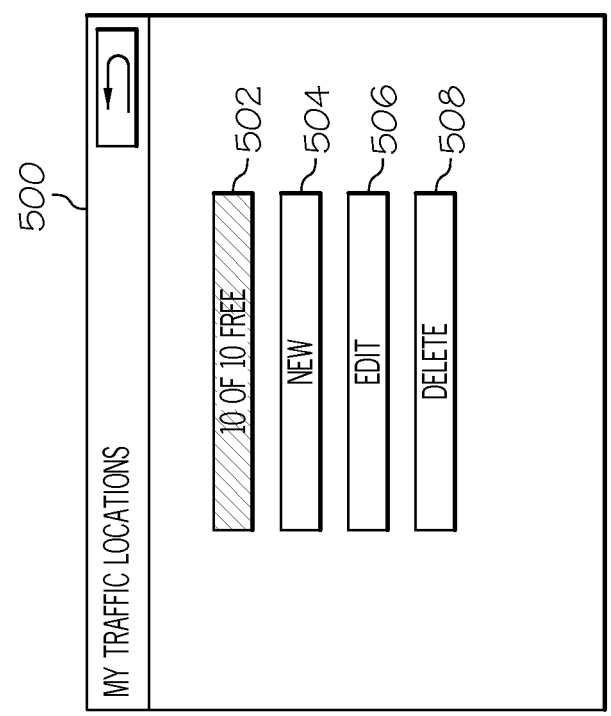
FIG. 5 schematically depicts an options control on the display of the navigation system of FIG. 1, according to one or more embodiments shown and described herein.

Referring once again to FIG. 2, the traffic location selection input control 200 may include an options icon 204. Upon selecting the options icon 204 (e.g., by detecting tactile input indicative of a selection of the options icon 204), the navigation system 100 may present an options control 500 on the display 108, as depicted in FIG. 5. Referring now to FIG. 5, the options control 500 may include a number of traffic locations free icon 502, a new icon 504, an edit icon 506, and a delete icon 508. The number of traffic locations free icon 502 may provide a visual indication of the number of pre-defined locations of interest that may be added to the navigation system 100. The new icon 504 may provide the ability to define a new pre-defined location of interest that will be stored in the one or more memory modules 106, for which traffic information may be provided as described above. The edit icon 506 may provide the ability to edit a pre-defined location of interest already stored in the one or more memory modules 106. The delete icon 508 may provide the ability to delete a pre-defined location of interest from the one or more memory modules 106. It should be understood that in other embodiments, the options control 500 may differ from that shown in FIG. 5. Other embodiments may lack the options control 500 (e.g., embodiments that do not include an options icon 204 on traffic location selection input control 200).

Figure 6:
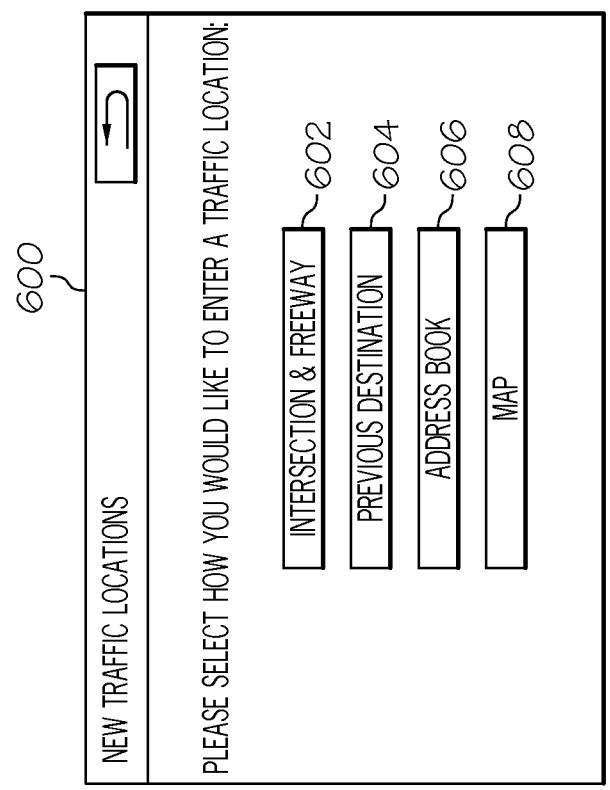
FIG. 6 schematically depicts a new location control on the display of the navigation system of FIG. 1, according to one or more embodiments shown and described herein.

Upon selecting the new icon 504 (e.g., by detecting tactile input indicative of a selection of the new icon 504), the navigation system 100 may present a new location control 600, as depicted in FIG. 6. Referring now to FIG. 6, the new location control 600 may include an intersection & freeway icon 602, a previous destination icon 604, an address book icon 606, and a map icon 608. Upon selecting the intersection & freeway icon 602 (e.g., by detecting tactile input indicative of a selection of the intersection & freeway icon 602), the navigation system 100 may receive an input indicative of a freeway and/or intersection, and store a pre-defined location of interest in the one or more memory modules 106 associated with the received input. Upon selecting the previous destination icon 604 (e.g., by detecting tactile input indicative of a selection of the previous destination icon 604), the navigation system 100 may receive an input indicative of a previous destination stored in the one or more memory modules 106, and store a pre-defined location of interest in the one or more memory modules 106 associated with the received input. Upon selecting the address book icon 606 (e.g., by detecting tactile input indicative of a selection of the address book icon), the navigation system 100 may receive an input indicative of an entry in an address book stored in the one or more memory modules 106, and store a pre-defined location of interest in the one or more memory modules 106 associated with the received input. In other embodiments, pre-defined locations of interest may be added to the navigation system 100 and stored in the one or more memory modules 106 in other ways. It should be understood that in other embodiments, the new location control 600 may differ from that shown in FIG. 6. Other embodiments may lack the new location control 600.

Figure 7:
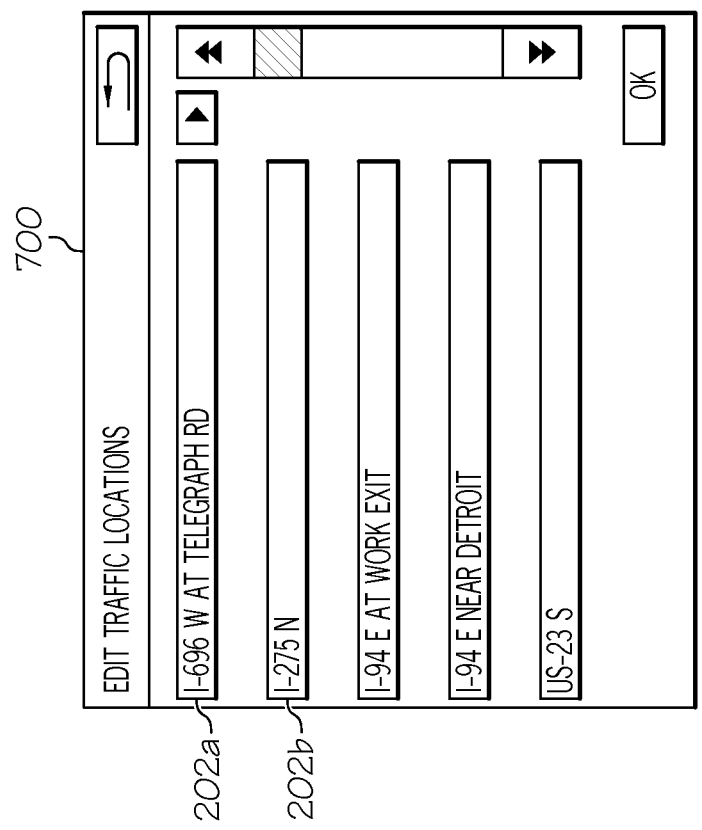
FIG. 7 schematically depicts an edit locations control on the display of the navigation system of FIG. 1, according to one or more embodiments shown and described herein.

Referring once again to FIG. 5, upon selecting the edit icon 506 (e.g., by detecting tactile input indicative of a selection of the edit icon 506), the navigation system 100 may present an edit locations control 700, as depicted in FIG. 7. The edit locations control 700 may display a plurality of traffic location icons, each of which is associated with a pre-defined location of interest stored in the one or more memory modules 106. Upon selecting any of the traffic location icons (e.g., by detecting tactile input indicative of a selection of a traffic location icon), the navigation system 100 may enable data associated with the traffic location icon to be modified in the one or more memory modules 106.

Figure 8:
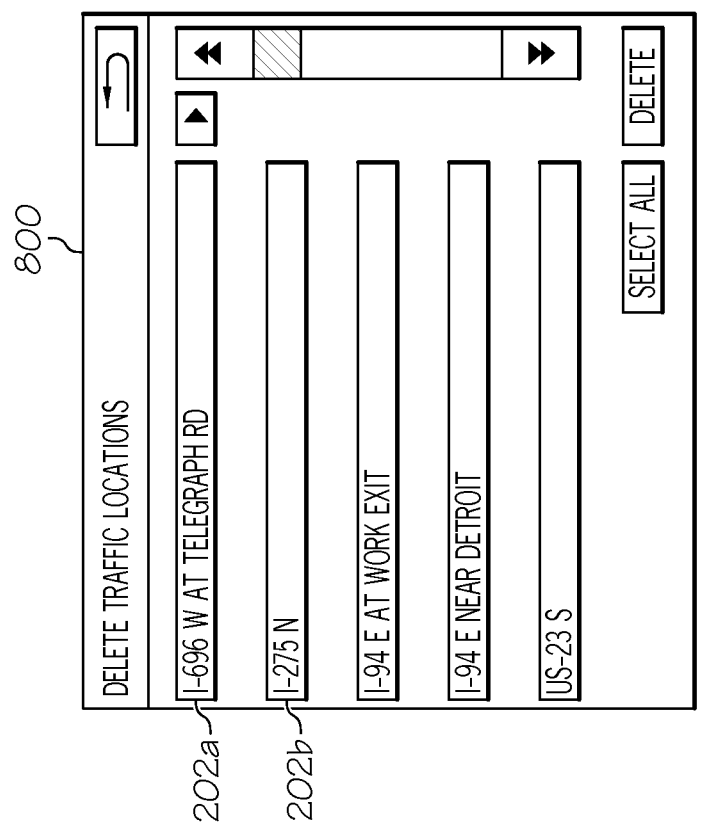
FIG. 8 schematically depicts a delete locations control on the display of the navigation system of FIG. 1, according to one or more embodiments shown and described herein.

Referring once again to FIG. 5, upon selecting the delete icon 508 (e.g., by detecting tactile input indicative of a selection of the delete icon 508), the navigation system 100 may present a delete locations control 800, as depicted in FIG. 8. The delete locations control 800 may display a plurality of traffic location icons, each of which is associated with a pre-defined location of interest stored in the one or more memory modules 106. Upon selecting any of the traffic location icons (e.g., by detecting tactile input indicative of a selection of a traffic location icon), the navigation system 100 may enable the pre-defined location of interest associated with the selected traffic location icon to be deleted from the one or more memory modules 106.

While the embodiment described in FIGS. 2-8 provides traffic information pertaining to the first pre-defined location of interest in response to receiving tactile input indicative of the selection of the first traffic location icon, in other embodiments, the machine readable instructions stored in the one or more memory modules 106, when executed by the one or more processors 102, may cause the navigation system 100 to automatically determine the pre-defined location of interest for which traffic information is provided. In one embodiment, the pre-defined location of interest for which traffic information is provided may be automatically determined based on a current position of the navigation system (or the current position of the vehicle if the navigation system is used in a vehicle).

Instead of, or in addition to the functionality described above, the navigation system 100 may also be operable to provide traffic information pertaining to a route. In an embodiment in which the navigation system 100 is operable to provide traffic information pertaining to a route, a first pre-defined location of interest and a second pre-defined location of interest are stored in the one or more memory modules 106. The machine readable instructions stored in the one or more memory modules 106, when executed by the one or more processors 102, may cause the navigation system 100 to transform the signal from the one or more global positioning system satellites into a current position of the navigation system 100.

The machine readable instructions stored in the one or more memory modules 106, when executed by the one or more processors 102, may cause the navigation system 100 to calculate a first distance from the first-predefined location of interest to the current position, calculate a second distance from the second pre-defined location of interest to the current position. The calculation of the first distance and second distance may be based on the distance between the GPS coordinates of the current position and the first pre-defined location of interest and the distance between the GPS coordinates of the current position and the second pre-defined location of interest. In another embodiment, the calculation of the first distance and second distance may be based on the road distance between the current position and the first pre-defined location of interest and the road distance between the current position and the second pre-defined location of interest, as determined by accessing the road data from the one or more memory modules 106. However, it should be understood that in other embodiments the first distance and the second distance may be calculated differently.

The machine readable instructions stored in the one or more memory modules 106, when executed by the one or more processors 102, may further cause the navigation system 100 to compare the first distance to the second distance to determine whether the first pre-defined location of interest or the second pre-defined location of interest is farther from the current position. The first pre-defined location of interest is determined to be farther from the current position than the second pre-defined location of interest if the first distance is greater than the second distance. Conversely, the second pre-defined location of interest is determined to be farther from the current position than the first pre-defined location of interest if the second distance is greater than the first distance.

The machine readable instructions stored in the one or more memory modules 106, when executed by the one or more processors 102, may cause the navigation system 100 to determine a route between the current position and the farther of the first pre-defined location of interest and the second pre-defined location of interest. Thus, when the first pre-defined location of interest is farther from the current position, the navigation system 100 determines a route between the current position and the first pre-defined location of interest. Conversely, when the second pre-defined location of interest is farther from the current position, the navigation system 100 determines a route between the current position and the second pre-defined location of interest. The route may be determined using routing logic stored in the one or more memory modules 106, which may access the road data stored in the one or more memory modules 106.

The machine readable instructions stored in the one or more memory modules 106, when executed by the one or more processors 102, may cause the navigation system 100 to provide traffic information pertaining to the determined route.

As stated above with reference to FIG. 3, in one embodiment, the navigation system 100 may present a map 300 on the display 108. The map 300 includes a geographic area including at least a portion of the determined route. In some embodiments, the presented map may display the entire determined route, while in other embodiments only a portion of the determined route may be displayed on the map. In some embodiments, at least a portion of the determined route may be highlighted on the presented map.

Still referring to FIG. 3, the traffic information pertaining to the determined route may be visually presented on the map. In one embodiment, the visually presented traffic information may include a traffic flow indicator 304 positioned adjacent to or on top of an associated road segment of the map. The traffic flow indicator 304 provides a visual indication of the traffic flow on the associated segment. In some embodiments, the traffic flow indicator 304 may be superimposed on the associated road segment. In other embodiments, the traffic flow indicator 304 may be displayed adjacent to the associated road segment. While the traffic flow indicator 304 of FIG. 3 includes arrows, in other embodiments, the traffic flow indicator 304 may not include arrows, for example if it is displayed as a solid line. The color of the traffic flow indicator 304 may provide a visual indication of the traffic flow on the associated road segment. For example, in one embodiment, the traffic flow indicator may be green to indicate light traffic, yellow or orange to indicate medium traffic, red to indicate high traffic, and black to indicate that the road is closed. However, it should be understood that in other embodiments the traffic flow indicator may be colored differently to communicate other information pertaining to the road segment that it is associated with. While the embodiment of FIG. 3 includes a traffic flow indicator 304, other embodiments may provide traffic information pertaining to the first pre-defined location of interest in another manner.

In an embodiment that visually presents the traffic information pertaining to the determined route on the map, the visually presented traffic information may include an incident icon 302 positioned adjacent to or on top of an associated road segment of the map. The incident icon may provide a visual indication of conditions that may impact travel along a road segment on or near the determined route (e.g., traffic information, weather information, construction information, road closure information, disaster information, etc.). The incident icons of FIG. 4, as described above, may be utilized. While the embodiment of FIG. 3 includes an incident icon 302, other embodiments may provide traffic information pertaining to the first pre-defined location of interest in another manner. Moreover, while the embodiment of FIG. 3 includes both a traffic flow indicator 304 and an incident icon 302, other embodiments may include only one of the traffic flow indicator 304 and the incident icon 302.

As an alternative to, or in addition to, providing traffic information pertaining to the determined route on the display 108 as described above, the machine readable instructions stored in the one or more memory modules 106, when executed by the one or more processors 102, cause the navigation system 100 to provide the traffic information as an audible indication through speaker 128. The audible indication may include one or more incidents on or near the determined route (e.g., traffic information, weather information, construction information, road closure information, disaster information, etc.). The audible indication may also include traffic flow information pertaining to one or more road segments on or near the determined route (e.g., average speed, relative traffic volume, etc.).

The machine readable instructions stored in the one or more memory modules 106, when executed by the one or more processors 102, may cause the navigation system 100 to deactivate turn-by-turn navigation provided by the navigation system 100 on the display 108 or via the speaker 128. Turn-by-turn navigation may be deactivated because the user may not wish to receive turn-by-turn navigation for the determined route if it is a route familiar to the user. In such an embodiment, the navigation system 100 may be configured to determine, based on the current position of the navigation system, whether the navigation system (or vehicle incorporating the navigation system) has deviated from the determined route. The navigation system 100 may activate turn-by-turn navigation in response to determining that the navigation system 100 has deviated from the determined route.

In some embodiments, the first pre-defined location of interest corresponds to a home location, the second pre-defined location of interest correspond to a work location, and the determined route corresponds to at least a portion of a commuting route. In such embodiments, the machine readable instructions stored in the one or more memory modules 106, when executed by the one or more processors 102, may cause the navigation system 100 to present a commute icon on the display 108. The commute icon may be associated with the work location and the home location. The navigation system 100 may detect a tactile input indicative of a selection of the commute icon and provide traffic information pertaining to the determined route in response to the detected tactile input.

It should be understood that embodiments described herein provide for navigation systems and vehicles for providing traffic information pertaining to pre-defined locations of interest. The navigation systems and vehicles provided herein may allow a user to quickly and easily access traffic information pertaining to a pre-defined location of interest in order to reduce the driver's travel time by avoiding traffic on roads that the user may travel near the pre-defined location of interest. The navigation systems and vehicles provided herein may also allow a user to quickly and easily access traffic information pertaining to a particular routes (e.g., the driver's commuting route between home and work) so that the driver may navigate in a manner that reduces travel time.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A navigation system for providing traffic information, the navigation system comprising:
   one or more processors;
   a display communicatively coupled to the one or more processors;
   one or more memory modules communicatively coupled to the one or more processors;
   a first pre-defined location of interest stored in the one or more memory modules; and
   machine readable instructions stored in the one or more memory modules that cause the navigation system to perform at least the following when executed by the one or more processors:
      present, automatically, a traffic location selection input control on the display, wherein the traffic location selection input control comprises a first traffic location icon associated with the first pre-defined location of interest;
      detect a tactile input indicative of a selection of the first traffic location icon; and
      provide, automatically, traffic information pertaining to the first pre-defined location of interest on the display in response to detecting the tactile input indicative of the selection of the first traffic location icon.

2. The navigation system of claim 1, wherein the machine readable instructions stored in the one or more memory modules further cause the navigation system to perform at least the following when executed by the one or more processors:
   receive the first pre-defined location of interest; and
   store the received first pre-defined location of interest in the one or more memory modules.

3. The navigation system of claim 1, wherein the machine readable instructions stored in the one or more memory modules further cause the navigation system to perform at least the following when executed by the one or more processors:
   present, automatically, a map including a geographic area surrounding the first pre-defined location of interest on the display; and
   present the traffic information visually on the map.

4. The navigation system of claim 3, wherein the visually presented traffic information includes a traffic flow indicator, wherein the traffic flow indicator is positioned adjacent to or on top of a road segment of the map.

5. The navigation system of claim 3, wherein the presented map is centered about the first pre-defined location of interest.

6. The navigation system of claim 3, wherein the visually presented traffic information includes an incident icon.

7. The navigation system of claim 1, wherein the traffic information is provided as an audible indication.

8. The navigation system of claim 1, wherein the display is a touchscreen and the machine readable instructions stored in the one or more memory modules further cause the navigation system to perform at least the following when executed by the one or more processors:
   detect the tactile input from a surface of or ajacent to the display.

9. A navigation system for providing traffic information, the navigation system comprising:
   one or more processors;
   a display communicatively coupled to the one or more processors;
   a satellite antenna communicatively coupled to the one or more processors, wherein the satellite antenna receives a signal from one or more global positioning system satellites;

one or more memory modules communicatively coupled to the one or more processors;
a first pre-defined location of interest and a second pre-defined location of interest stored in the one or more memory modules; and
machine readable instructions stored in the one or more memory modules that cause the navigation system to perform at least the following when executed by the one or more processors:
  transform the signal from the one or more global positioning system satellites into a current position of the navigation system;
  calculate, automatically, a first distance from the first pre-defined location of interest to the current position;
  calculate, automatically, a second distance from the second pre-defined location of interest to the current position;
  compare, automatically, the first distance and the second distance to determine whether the first pre-defined location of interest or the second pre-defined location of interest is farther from the current position;
  determine, automatically, a route between the current position and the farther of the first pre-defined location of interest and the second pre-defined location of interest;
  provide traffic information pertaining to the determined route; and
  deactivate turn-by-turn navigation.

10. The navigation system of claim 9, wherein the machine readable instructions stored in the one or more memory modules further cause the navigation system to perform at least the following when executed by the one or more processors:
  receive the first pre-defined location of interest and the second pre-defined location of interest; and
  store the received first pre-defined location of interest and the second pre-defined location of interest in the one or more memory modules.

11. The navigation system of claim 9, wherein the machine readable instructions stored in the one or more memory modules further cause the navigation system to perform at least the following when executed by the one or more processors:
  present, automatically, a map including a geographic area including at least a portion of the determined route; and
  present the traffic information visually on the map.

12. The navigation system of claim 11, wherein the visually presented traffic information includes a traffic flow indicator, wherein the traffic flow indicator is positioned adjacent to or on top of a road segment of the map.

13. The navigation system of claim 11, wherein the visually presented traffic information includes an incident icon.

14. The navigation system of claim 9, wherein the traffic information is provided as an audible indication.

15. The navigation system of claim 14, wherein the audible indication includes a traffic warning along the route.

16. The navigation system of claim 11, wherein at least a portion of the determined route is highlighted on the displayed map.

17. The navigation system of claim 9, wherein the machine readable instructions stored in the one or more memory modules further cause the navigation system to perform at least the following when executed by the one or more processors:
  determine, based on the current position, whether the navigation system has deviated from the route; and
  activate turn-by-turn navigation in response to determining that the navigation system has deviated from the route.

18. The navigation system of claim 9, wherein the first pre-defined location of interest corresponds to a home location, the second pre-defined location of interest corresponds to a work location, and the determined route corresponds to at least a portion of a commuting route.

19. The navigation system of claim 18, wherein the machine readable instructions stored in the one or more memory modules further cause the navigation system to perform at least the following when executed by the one or more processors:
  present, automatically, a commute icon on the display, wherein the commute icon is associated with the home location and the work location; and
  detect a tactile input indicative of a selection of the commute icon, wherein traffic information pertaining to the determined route is provided in response to the detected tactile input.

20. A vehicle for providing traffic information, the vehicle comprising:
  one or more processors;
  a display communicatively coupled to the one or more processors;
  a satellite antenna communicatively coupled to the one or more processors, wherein the satellite antenna receives a signal from one or more global positioning system satellites;
  one or more memory modules communicatively coupled to the one or more processors;
  a home location and a work location stored in the one or more memory modules; and
  machine readable instructions stored in the one or more memory modules that cause the vehicle to perform at least the following when executed by the one or more processors:
    present, automatically, a commute icon on the display, wherein the commute icon is associated with the home location and the work location;
    detect a tactile input indicative of a selection of the commute icon;
    transform the signal from the one or more global positioning system satellites into a current position of the navigation system;
    calculate, automatically, a first distance from the home location to the current position;
    calculate, automatically, a second distance from the work location to the current position;
    compare, automatically, the first distance and the second distance to determine whether the home location or the work location is farther from the current position;
    determine, automatically, a route between the current position and the farther of the home location and the work location;
    provide traffic information pertaining to the determined route; and
    deactivate turn-by-turn navigation.

* * * * *